United States Patent
Pasqua (10) Patent No.: US 9,573,653 B2
(45) Date of Patent: Feb. 21, 2017

(54) MOTOR DRIVEN DERAILLEUR FOR A BICYCLE GEARSHIFT

(71) Applicant: CAMPAGNOLO S.r.l., Vicenza (IT)

(72) Inventor: Paolo Pasqua, Camisano Vicentino (IT)

(73) Assignee: Campagnolo S.r.l., Vicenza (IT)

( * ) Notice: Subject to any disclaimer, the term of this patent is extended or adjusted under 35 U.S.C. 154(b) by 199 days.

(21) Appl. No.: 14/532,370

(22) Filed: Nov. 4, 2014

(65) Prior Publication Data
US 2015/0126314 A1    May 7, 2015

(30) Foreign Application Priority Data

Nov. 4, 2013  (IT) ............................. MI2013A1825

(51) Int. Cl.
| | | |
|---|---|---|
| B62M 9/1344 | (2010.01) | |
| B62M 9/132 | (2010.01) | |
| B62M 9/122 | (2010.01) | |
| B62M 9/126 | (2010.01) | |
| B62M 9/00 | (2006.01) | |

(52) U.S. Cl.
CPC ........... *B62M 9/1344* (2013.01); *B62M 9/122* (2013.01); *B62M 9/126* (2013.01); *B62M 9/132* (2013.01); *B62M 2009/007* (2013.01)

(58) Field of Classification Search
CPC ....... B62M 9/122; B62M 9/126; B62M 9/132; B62M 9/1344; B62M 9/1244
See application file for complete search history.

(56) References Cited

U.S. PATENT DOCUMENTS

| | | | |
|---|---|---|---|
| 3,919,891 A | 11/1975 | Stuhlmuller et al. | |
| 9,085,340 B1 * | 7/2015 | Sala | ....................... B62M 9/132 |
| 2003/0092519 A1 * | 5/2003 | Fukuda | .................. B62M 9/122 |
| | | | 474/70 |
| 2005/0189158 A1 * | 9/2005 | Ichida | .................... B62M 25/08 |
| | | | 180/260 |

(Continued)

FOREIGN PATENT DOCUMENTS

| | | |
|---|---|---|
| EP | 1310423 A2 | 5/2003 |
| EP | 1818253 A2 | 8/2007 |
| FR | 2247376 A1 | 5/1975 |

OTHER PUBLICATIONS

Italian Search Report and Written Opinion in Italian Application No. IT MI2013A001825, May 21, 2014 with English translation.

*Primary Examiner* — William E Dondero
*Assistant Examiner* — Robert T Reese
(74) *Attorney, Agent, or Firm* — Volpe and Koenig, P.C.

(57) ABSTRACT

A motor actuated derailleur for a bicycle gearshift that has a support body adapted for mounting on a bicycle frame. A chain guide moves a bicycle chain between different engaged positions on respective gear wheels. A pair of connecting rods connects said chain guide to said support body with a first connecting rod of said pair of connecting rods being rotatable about a first rotation axis (X) at a first end thereof. A motor housed in said support body has an output shaft able to rotate about a second rotation axis. A transmission between said motor and said first connecting rod is housed in an inner chamber of said support body that comprises at least one adjustable end stop element that prevents the rotation of the output shaft beyond a predetermined rotation angle, in at least one of the two directions of rotation of the output shaft.

11 Claims, 8 Drawing Sheets

(56) References Cited

U.S. PATENT DOCUMENTS

| | | | |
|---|---|---|---|
| 2006/0189422 A1* | 8/2006 | Ichida | B62M 9/132 474/80 |
| 2007/0184925 A1* | 8/2007 | Ichida | B62M 25/08 474/80 |
| 2009/0191994 A1* | 7/2009 | Takamoto | B62M 9/122 474/70 |
| 2014/0287856 A1* | 9/2014 | Kuwayama | B62M 9/132 474/80 |

* cited by examiner

MOTOR DRIVEN DERAILLEUR FOR A BICYCLE GEARSHIFT

CROSS REFERENCE TO RELATED APPLICATION

This application claims the benefit of Italian Application No. MI2013A001825, which was filed on Nov. 4, 2013, and is incorporated herein by reference as if fully set forth.

FIELD OF INVENTION

The present invention concerns a motor driven derailleur for a bicycle gearshift. The invention also concerns a bicycle gearshift comprising the aforementioned derailleur. Preferably, the bicycle is a racing bicycle.

BACKGROUND

As known, the bicycle is a mechanical means of transport moved by muscle force that is transmitted to the rear "driving" wheel through a motion transmission system. It comprises a pair of cranks, on which the cyclist exerts a propulsive thrust, one or more driving gear wheels, set in rotation by direct coupling with the pedal cranks, and one or more driven gear wheels or "sprockets", set in rotation by the driving gear wheels through a chain, said sprockets being coupled with the hub of the rear wheel.

In particular, racing bicycles comprise a plurality of sprockets of various diameters and a plurality of driving gear wheels, also of various diameters. The chain simultaneously engages a driving gear wheel and a sprocket and can selectively move on them through a front gearshift and a rear gearshift, so as to obtain the combination of driving gear wheel and sprocket that offers the transmission ratio most suited to the travel conditions.

The front gearshift is mounted on the bicycle frame close to the plurality of driving gear wheels and comprises a derailleur that moves the chain from one driving gear wheel to another. The rear gearshift is mounted on the bicycle frame close to the plurality of sprockets and comprises a derailleur that moves the chain from one sprocket to another.

In the prior art, derailleurs of the front and rear gearshifts are made according to an articulated parallelogram mechanism in which the sides of the parallelogram are articulated together in pairs, along respective substantially parallel rotation axes, through pins. In particular, such an articulated parallelogram is formed from a support body, intended to stay fixed with respect to the frame, a so-called chain guide suitable for moving the chain between different engagement positions on respective gear wheels (the gears of the crankset, in the case of the derailleur of the front gearshift, or the sprockets of the sprocket set, in the case of the derailleur of the rear gearshift), and a pair of articulation arms or connecting rods (generally identified as outer connecting rod and inner connecting rod), which connect the chain guide to the support body in a mobile manner. In the case of the derailleur of the front gearshift, the chain guide comprises the element that in the jargon is called "fork", whereas in the case of the derailleur of the rear gearshift, the chain guide comprises a rocker arm.

Each connecting rod is rotatably connected to the support body and to the chain guide through respective articulation pins inserted in respective holes.

The derailleurs can be manually actuated (such derailleurs are also known as mechanical derailleurs) or motor actuated (such derailleurs are also known as electrically driven derailleurs).

SUMMARY

The present description and the following claims are referred to the case of motor actuated derailleurs.

In such motor driven derailleurs a connecting rod of the articulated parallelogram is able to rotate about a rotation axis at an end thereof provided with a toothed sector, which is coupled with a matching toothed sector of an output shaft of a gear motor unit of the derailleur.

In the present description and in the following claims, by the expression gear motor unit a group is meant comprising an electric motor and a mechanical reducer. The gear motor comprises an output shaft that rotates at a geared down number of revs with respect to the number of revs of a drive shaft of the electric motor.

The gear motor unit is driven by the cyclist through controls generally located on the handlebars of the bicycle. An electronic control board, where suitable software is loaded, manages the rotation of the output shaft of the gear motor unit to carry out changes of the transmission ratio set by the cyclist, i.e. to make the desired combination of driving gear wheel and sprocket.

Thanks to the coupling between the toothed sectors of the output shaft and of the end of the connecting rod, in which a gear down of the transmission takes place (for example equal to ½), the rotation of the output shaft causes a corresponding rotation of the connecting rod, with the consequent desired movement of the chain guide for precise gearshifting.

The Applicant has found that a motor driven derailleur of the type described above has the drawback that gearshifting is exclusively down to the electronic control board of the gear motor unit and the software that manages it, so that there may be—in the case of failure/anomaly of the electronic control board or of the software itself—in addition to the loss of control of gearshifting, also the sudden dropping of the chain outside of the gears of the crankset (in the case of the derailleur of the front gearshift) or of the sprockets of the sprocket set (in the case of the derailleur of the rear gearshift). Such sudden dropping of the chain could have very serious consequences to the well-being of the cyclist, who could lose control of the bicycle and fall.

The technical problem forming the basis of the present invention is to provide a motor driven derailleur for a bicycle gearshift that safeguards the cyclist in the case of failure/anomaly of the electronic control board of the gear motor unit of the derailleur or of the relative software.

The idea for a solution of the present invention is to provide a limitation to the rotation of the output shaft beyond a certain rotation angle, so as to avoid the risk of the chain dropping.

The present invention therefore concerns, in a first aspect thereof, a derailleur according to claim 1.

Preferred characteristics of the derailleur of the invention are stated in claims 2-10.

In particular, the present invention concerns a motor driven derailleur for a bicycle gearshift, comprising:

a support body suitable for being mounted on a bicycle frame, a chain guide suitable for moving a bicycle chain between different engaged positions on respective gear wheels, a pair of connecting rods that connect said chain guide to said support body in a mobile manner, a first connecting rod of said pair of connecting rods being rotatable about a first rotation axis at a first end thereof, a gear motor unit, housed in said support body and provided with an output shaft able to rotate about a second rotation axis, a motion transmission between said gear motor unit and said first connecting rod, housed in an inner chamber of said support body, characterised in that said inner chamber comprises at least one adjustable end stop element that prevents the rotation of the output shaft beyond a certain rotation angle, in at least one of the two directions of rotation of the output shaft.

Advantageously, in the case of failure/anomaly of the electronic control board of the gear motor unit of the derailleur or of the relative software, the movement of the chain guide is still limited by the end stop element, which thus has the function of a safety component.

Through the adjustment of the end stop element, it is possible to avoid the possibility of the chain suddenly dropping outside the gears of the crankset or of the sprockets of the sprocket set.

Preferably, said motion transmission comprises a first toothed sector formed on said first connecting rod at said first end, and a second toothed sector formed on said output shaft, the second toothed sector matching and being coupled with the first toothed sector.

In the present description and in the following claims, by the expression "toothed sector formed on an element" both the case of the toothed sector made in one piece on the element and the case of a toothed sector associated with the element are meant.

In a preferred embodiment of the derailleur of the invention, the aforementioned at least one end stop element is a pin provided with an external threading, which engages in a threaded through hole formed in a wall of said support body and facing into said inner chamber, wherein the position of said pin in said hole is adjustable through screwing of the pin into the hole.

Advantageously, the aforementioned pin is a component that is easy to make and allows simple and precise adjustment.

Preferably, the aforementioned output shaft comprises a radial projection that hits said pin in an end stop condition.

Advantageously, the aforementioned radial projection can be easily made on the output shaft.

Preferably, the aforementioned radial projection is made, along the second rotation axis, substantially at said second toothed sector.

Advantageously, the aforementioned radial projection is made on an angular part of the output shaft that is distinct from an angular part where the toothed sector is made.

In a preferred embodiment of the derailleur of the invention, the aforementioned at least one end stop element prevents the rotation of the output shaft beyond a certain rotation angle in the direction of rotation that corresponds to a movement of the chain guide towards the outside with respect to the bicycle frame on which the derailleur is mounted. In particular, the aforementioned certain rotation angle is that beyond which the chain would drop in a direction towards the outside with respect to the bicycle frame.

In a further preferred embodiment of the derailleur of the invention, in addition to the solution with the aforementioned pin, the aforementioned at least one end stop element comprises a further pin provided with an external threading, which engages in a further threaded through hole formed in said wall of said support body and facing into said inner chamber, in which the position of said further pin in said further hole is adjustable through screwing of the further pin into the further hole.

Preferably, the aforementioned output shaft comprises a further radial projection that hits said further pin in a further end stop condition, and prevents the rotation of the output shaft beyond a certain rotation angle in the direction of rotation that corresponds to a movement of the chain guide towards the bicycle frame on which the derailleur is mounted.

Advantageously, the further pin has the function of a safety component in the case of failure/anomaly of the electronic control board of the gear motor unit of the derailleur or of the relative software, preventing the chain from suddenly dropping outside of the gears of the crankset or of the sprockets of the sprocket set, towards the bicycle frame on which the derailleur is mounted.

Moreover, the aforementioned further pin is advantageously a component that is easy to make and allows simple and precise adjustment.

Preferably, the aforementioned further radial projection is made in a respective portion of the output shaft that is adjacent, along the second rotation axis, to a portion where said second toothed sector is made.

Advantageously, the aforementioned further radial projection can be easily made on the output shaft.

Preferably, the aforementioned gearshift is a front gearshift.

In a second aspect thereof, the present invention concerns a bicycle gearshift comprising a derailleur of the type described above.

BRIEF DESCRIPTION OF THE DRAWINGS

Further characteristics and advantages of the present invention will become clearer from the following detailed description of some preferred embodiments thereof, made with reference to the attached drawings and given for indicating and not limiting purposes. In such drawings.

DETAILED DESCRIPTION OF THE PREFERRED EMBODIMENTS

With first reference to FIGS. 1-5, a first embodiment of a motor driven derailleur for a bicycle gearshift in accordance with the present invention is shown. Such a derailleur is wholly indicated with 1. More specifically, a derailleur of the front gearshift is shown.

The following description is made with reference to the non-limiting case of the derailleur of the front gearshift; nevertheless, it can also refer, mutatis mutandis, to a derailleur of the rear gearshift having an analogous articulated parallelogram configuration.

The derailleur 1 of the front gearshift comprises an articulated quadrilateral actuation mechanism 101, more precisely in the form of an articulated parallelogram, moved by a gear motor unit 10, which is controlled by an electronic control board (not shown) driven by the cyclist.

The gear motor unit 10 comprises an electric motor 11 and a mechanical reducer 12. The gear motor comprises an output shaft 13 that has a geared down number of revs with respect to the number of revs of a drive shaft of the electric motor 11.

The mechanism 101 comprises, at the four sides of the parallelogram, a support body 102, a chain guide 103 and a pair of connecting rods 104 and 105. Such four components 102, 103, 104 and 105 are articulated together—about respective rotation axes—at four articulation pins 106, 107, 108 and 109.

The support body 102 is suitable for being mounted, at an attachment portion 1020 thereof, on a frame (not shown) of a bicycle.

The gear motor unit 10 is housed inside the support body 102, accessible by removing a suitable cover 102d of the support body 102.

The chain guide 103 is opposite the support body 102 in the actuation mechanism 101. Such a chain guide 103 comprises the so-called "fork". In the case of a derailleur of the rear gearshift, the chain guide comprises, instead of the fork, an attachment portion to a rocker arm of the chain guide.

The connecting rods 104 and 105 connect the chain guide 103 to the support body 102 in a mobile manner.

The connecting rod 105 is also identified as "inner connecting rod" since it is the one that in use faces the frame of the bicycle, whereas the connecting rod 104 is identified as "outer connecting rod" since it is the one that in use faces the outside, i.e. arranged on the opposite side to the frame of the bicycle.

The first pin 106 connects the support body 102 and the connecting rod 104, the second pin 107 connects the chain guide 103 and the connecting rod 104, the third pin 108 connects the support body 102 and the connecting rod 105 and the fourth pin 109 connects the chain guide 103 and the connecting rod 105.

Preferably, the first pin 106 and the second pin 107 are substantially the same as each other, just like the third pin 108 and the fourth pin 109.

The connecting rod 104 is able to rotate about a rotation axis X at a first end 104a thereof provided with a toothed sector 104b.

The toothed sector 104b is coupled with a matching toothed sector 14 of the output shaft 13 of the gear motor unit 10, able to rotate about a rotation axis Y.

The toothed sector 14 of the output shaft 13 and the toothed sector 104b of the first end 104a of the connecting rod 104 form a motion transmission between the gear motor unit 10 and the first connecting rod 104 and they are housed in an inner chamber 102a of the support body 102.

A part of the connecting rod 104 juts out from the inner chamber 102a from a through opening 102e of the inner chamber 102a. Between the through opening 102e and the connecting rod 104 gaskets 102f are provided to limit as much as possible the entry of water or other contaminating agents (like dust or mud) into the inner chamber 102a, which could compromise the correct operation of the derailleur 1.

In accordance with a characteristic of the present invention, the inner chamber 102a comprises one or more adjustable end stop elements that prevent the rotation of the output shaft 13 beyond a certain rotation angle, in at least one of the two directions of rotation of the output shaft 13.

In the non-limiting case illustrated in FIGS. 1-5, the end stop element is a pin 20, which prevents the rotation of the output shaft 13 beyond a certain rotation angle in the clockwise direction of rotation (with reference to FIG. 5) of the output shaft 13.

Figure 1:
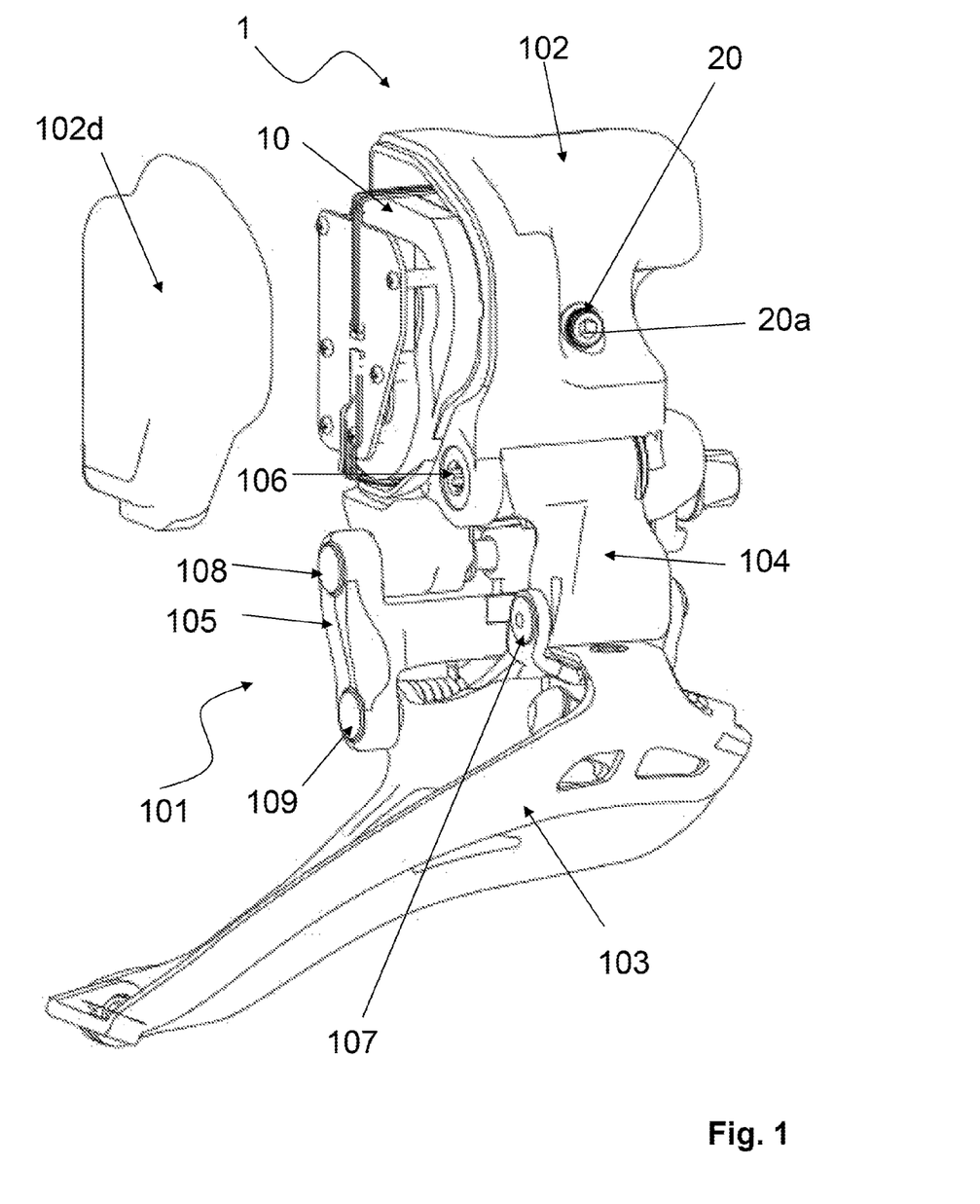
FIG. 1 is a perspective view of a motor driven derailleur according to the present invention.
Figure 2:
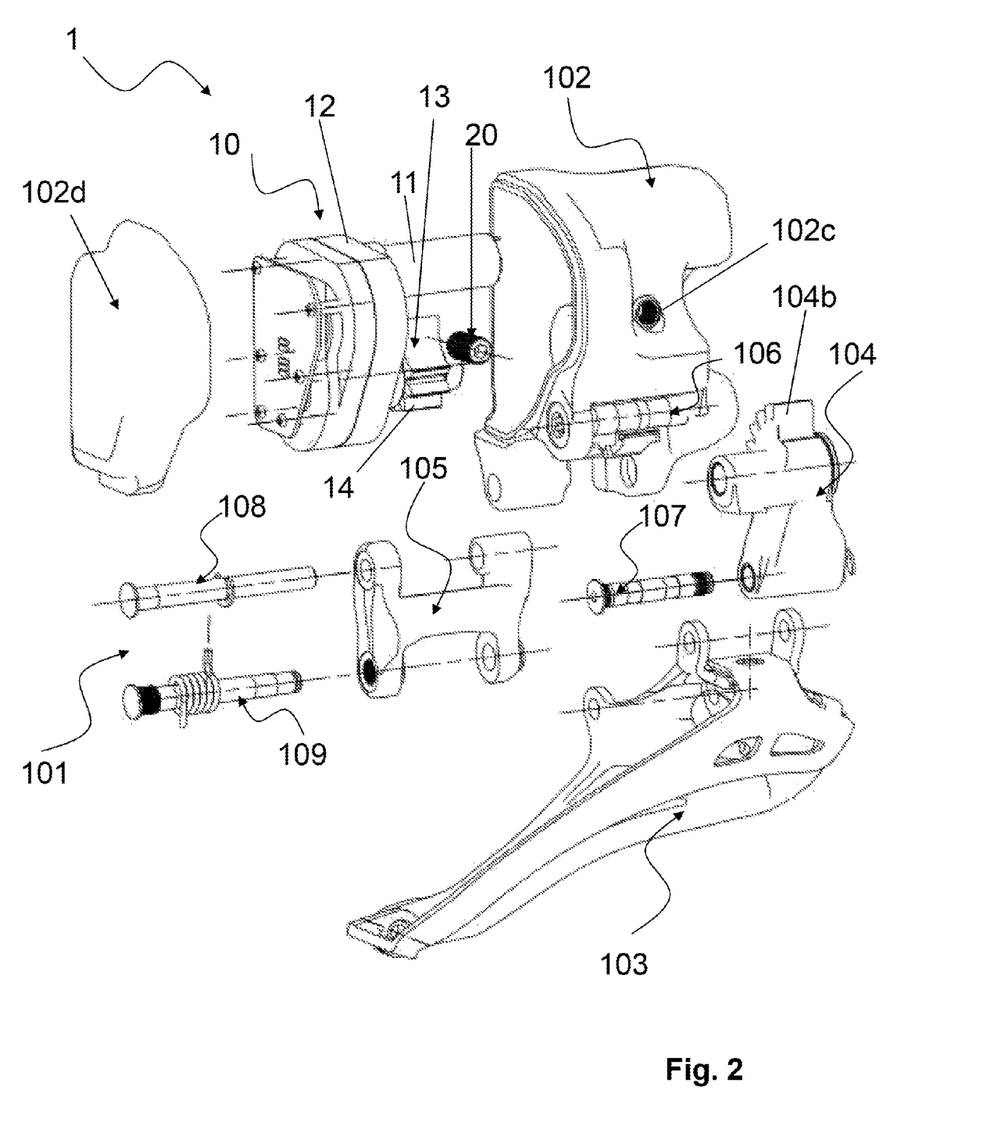
FIG. 2 is an exploded view of the derailleur of FIG. 1.
Figure 3:
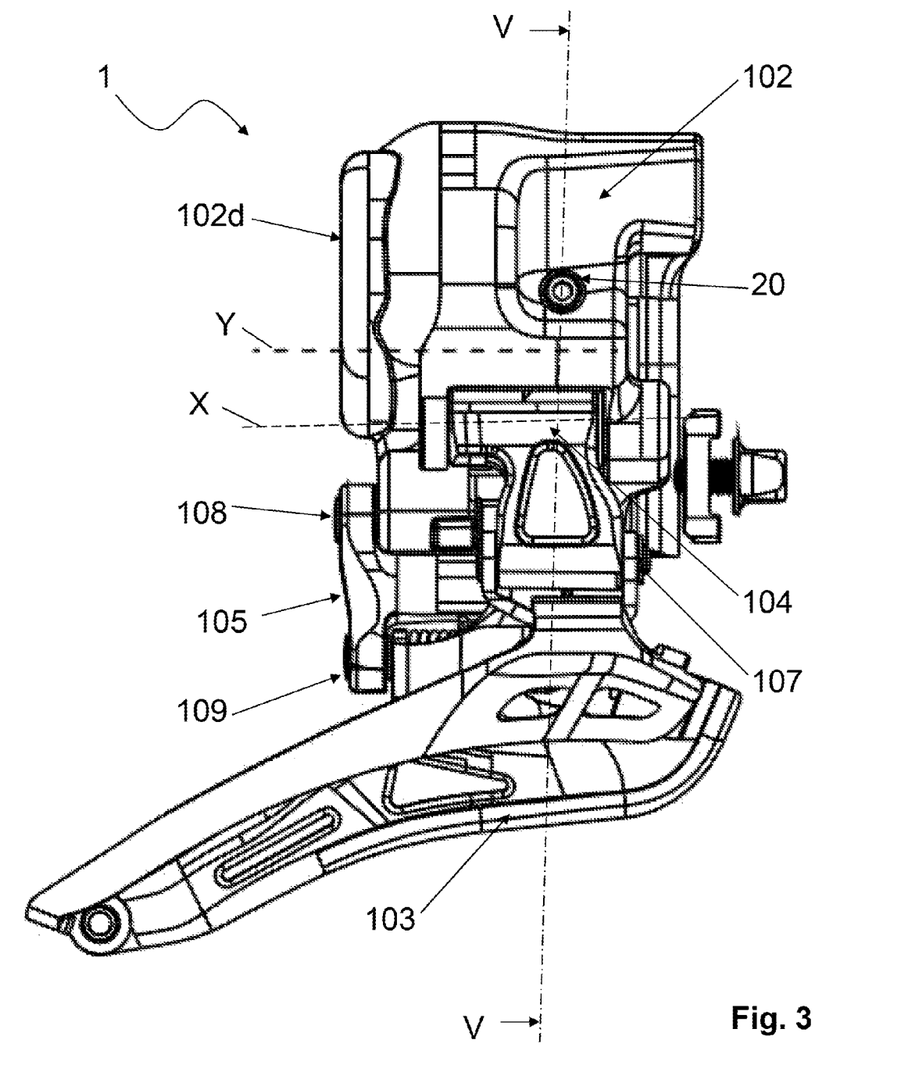
FIGS. 3 and 4 are side views of the derailleur of FIG. 1.
Figure 4:
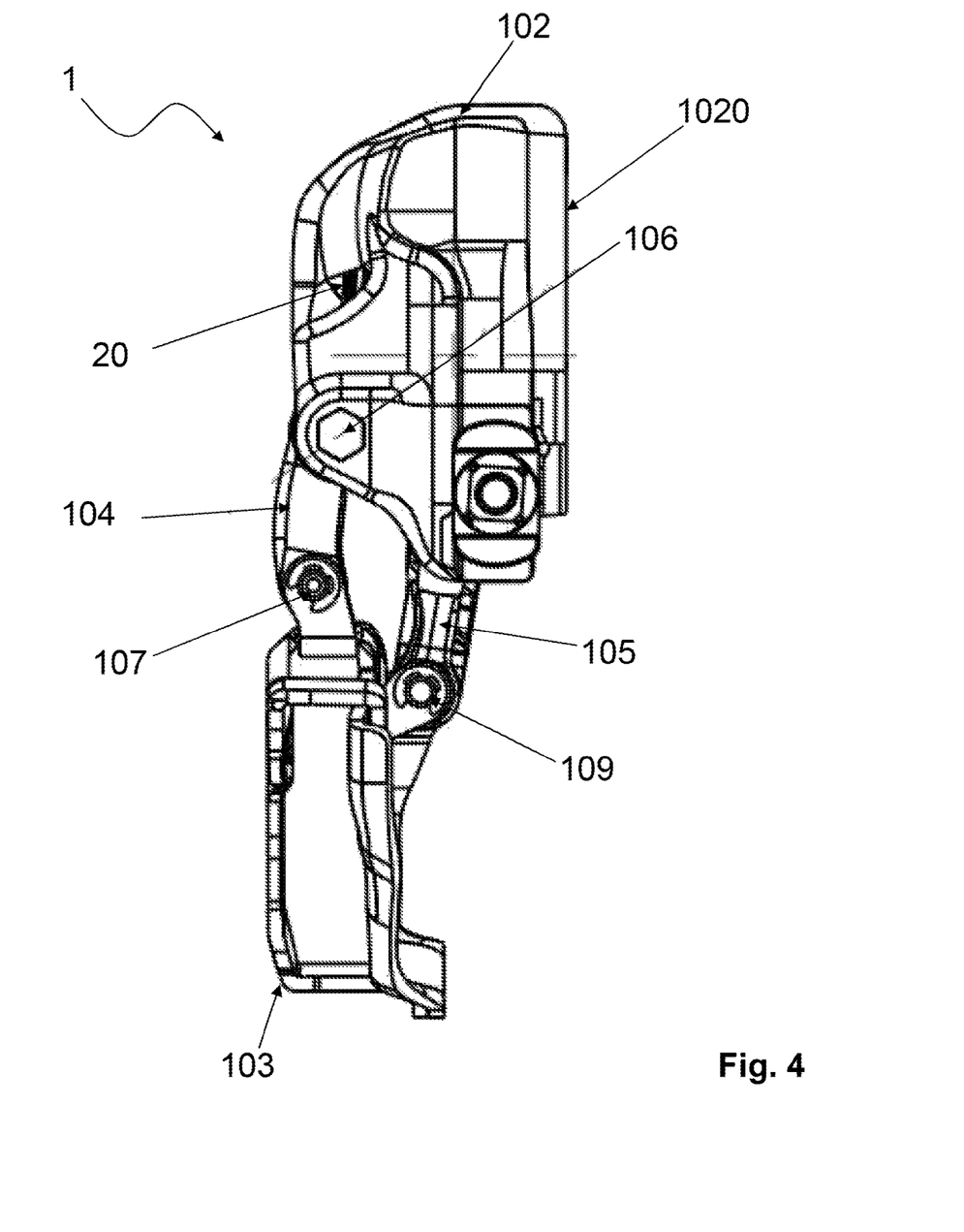
Figure 5:
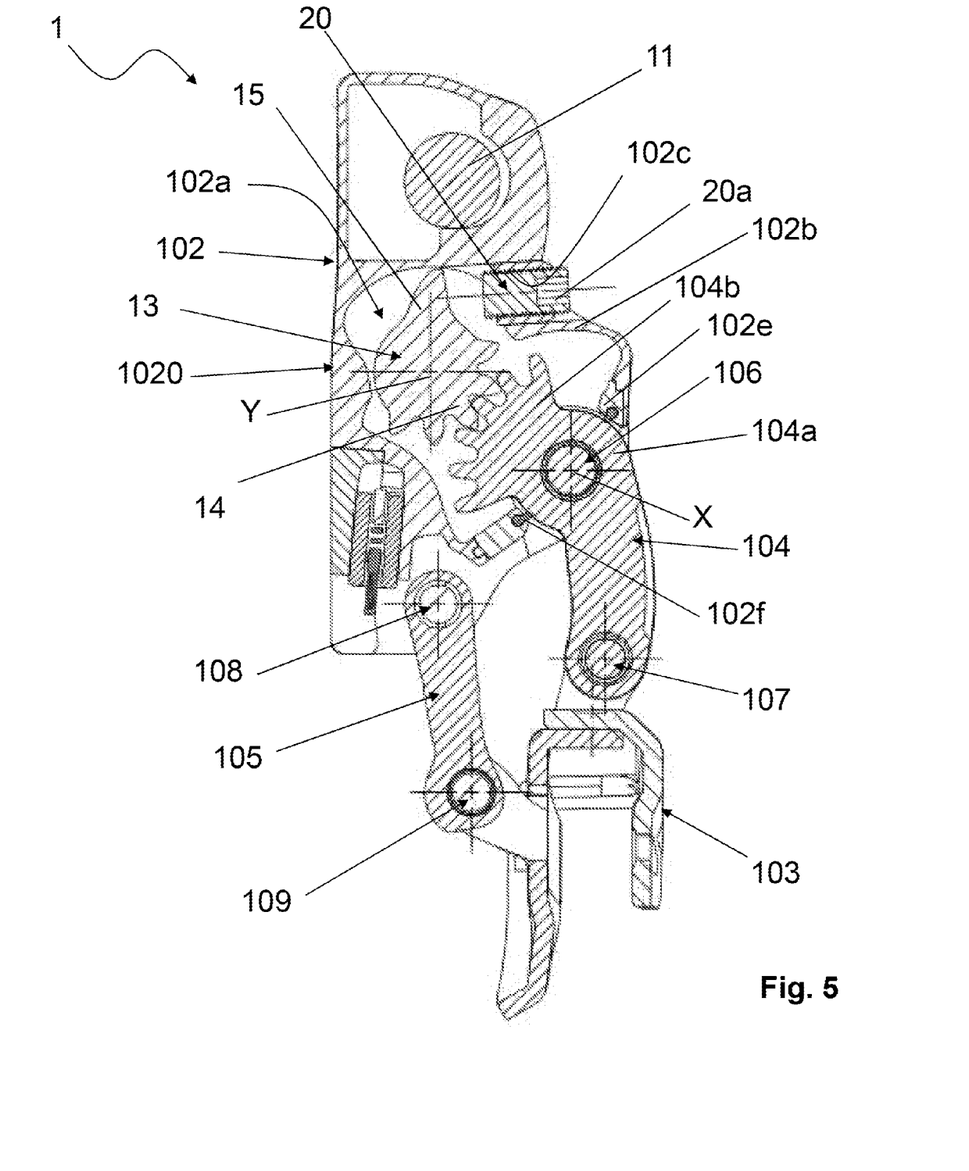
FIG. 5 is a section view of the derailleur of FIG. 1, taken according to the plane line V-V of FIG. 3.
Figure 6:
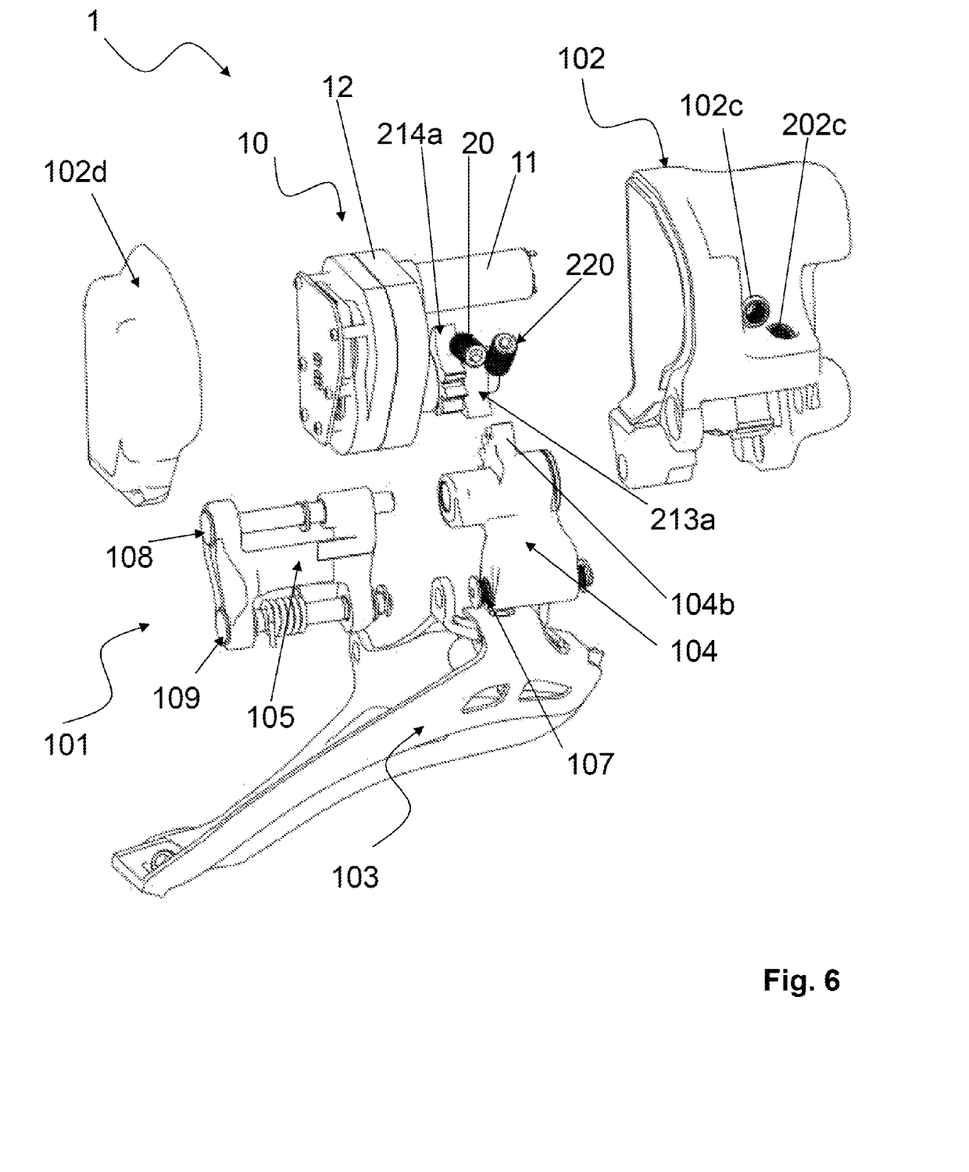
FIG. 6 is an exploded view of a further embodiment of a motor driven derailleur according to the present invention.
Figure 7:
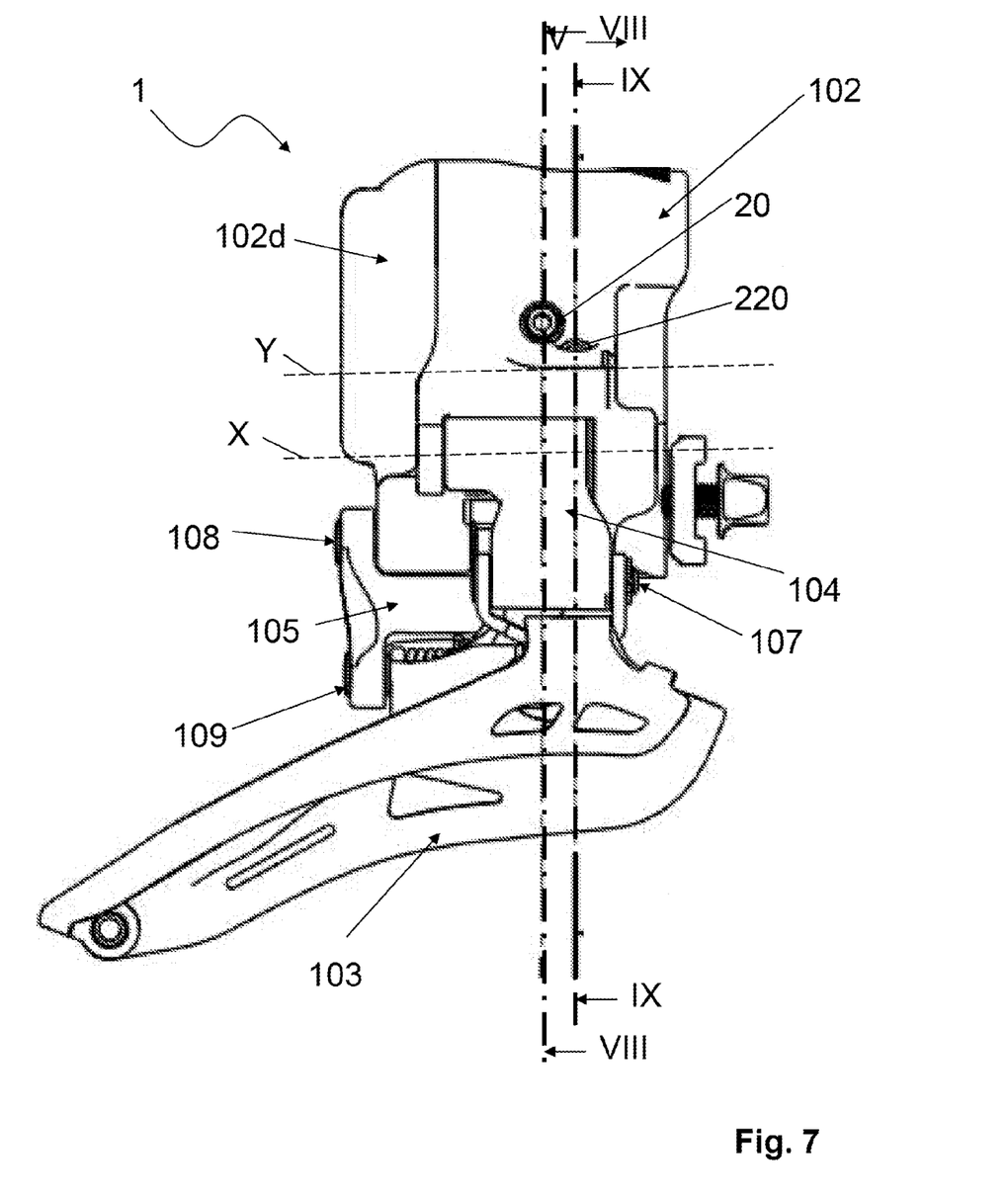
FIG. 7 is a side view of the derailleur of FIG. 6.
Figure 8:
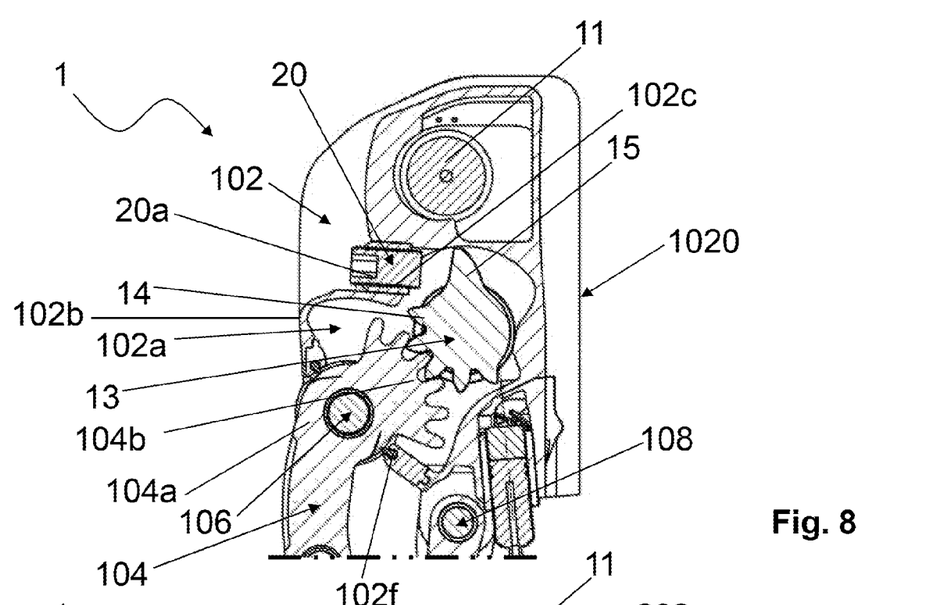
FIGS. 8 and 9 are section views of a portion of the derailleur of FIG. 6, taken, respectively, according to the plane lines VIII-VIII and IX-IX of FIG. 7.
Figure 9:
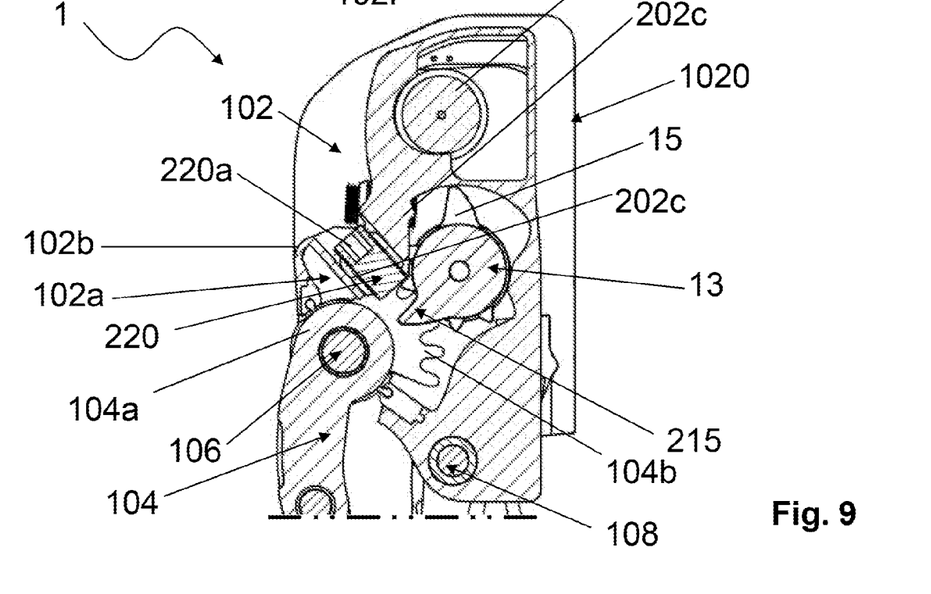

In other words, the pin 20 intervenes to prevent the rotation of the output shaft 13 beyond a certain rotation angle that would cause the chain to drop out from the driving gear wheels, in a direction opposite to that facing towards the bicycle frame.

The pin 20 is provided with an external threading that engages in a through hole 102c, formed in a wall 102b of the support body 102 and facing into the inner chamber 102a.

The position of the pin 20 in the hole 102c is adjustable through screwing of the pin 20 into the hole 102c.

The through hole 102c passes through the wall 102b of the support body 102, so that the pin 20 is accessible from the outside of the support body 102 when it is mounted on the bicycle frame. In the preferred embodiment illustrated in FIGS. 1-5, the pin 20 has a head recess 20a at an outer free end thereof, which is suitable for being maneuvered in rotation through an Allen key, a screwdriver or similar tool.

In the preferred embodiment illustrated in FIGS. 1-5, the output shaft 13 comprises a radial projection 15 that hits the pin 20 in an end stop condition.

The radial projection 15 is made, along the rotation axis Y, substantially at the toothed sector 14 of the output shaft 13. In particular, the radial projection 15 is made on an angular part of the output shaft 13 that is distinct from an angular part where the toothed sector 14 is made.

FIGS. 6-9 show a further embodiment of the motor driven derailleur of the invention. In such Figures, structural elements that are identical or equivalent from the functional point of view to those of the motor driven derailleur 1 described above with reference to FIGS. 1-5 will be attributed the same reference numerals and they will not be described any further.

In particular, this further embodiment of the derailleur 1 of the invention differs from the derailleur 1 of FIGS. 1-5 in that it comprises a further end stop element formed by a further pin 220 that prevents the rotation of the output shaft 13 beyond a certain rotation angle in the direction of rotation of the output shaft 13 opposite to that in which the pin 20 intervenes, i.e. a rotation angle that causes the chain to drop towards the bicycle frame. In other words, the further pin 220 prevents the rotation of the output shaft 13 beyond a certain rotation angle in the clockwise direction of rotation (with reference to FIGS. 8 and 9) of the output shaft 13.

The further pin 220 is provided with an external threading, which engages in a further through hole 202c, at least partially threaded, formed in the wall 102b of the support body 102 and facing into the inner chamber 102a.

The position of the further pin 220 in the further hole 202c is adjustable through screwing of the further pin 220 into the further hole 202c.

The further through hole 202c passes through the wall 102b of the support body 102, so that the further pin 220 is accessible from the outside of the support body 102 when it is mounted on the bicycle frame. In the preferred embodiment illustrated in FIGS. 6-9, the further pin 220 has a head recess 220a at an outer end thereof, which is suitable for being maneuvered in rotation through an Allen key, a screwdriver or similar tool.

In the preferred embodiment illustrated in FIGS. 6-9, the output shaft 13 comprises a further radial projection 215 that hits the pin 220 in a further end stop condition.

The further radial projection 215 is made in a portion 213a of the output shaft 13 that is adjacent, along the rotation axis Y, to a portion 214a where the toothed sector 14 is made.

In particular, in the preferred embodiment illustrated in FIGS. 6-9, the portion 213a is arranged axially farther outside the portion 214a with respect to the mechanical reducer 12 of the gear motor unit 10.

The operation of the derailleur 1 according to the present invention is already clear from what has been stated above, and it is described further hereafter.

In the case of the embodiment of FIGS. 1-5, the derailleur 1 is first mounted on the bicycle frame.

Then the end stop element is adjusted, i.e. the position of the pin 20 in the hole 102c of the support body 102 is adjusted.

Such adjustment is carried out by acting on the head recess 20a of the pin 20 with an Allen key, a screwdriver or similar tool, so as to screw the pin 20 into the hole 102c by a suitable amount.

In particular, the output shaft 13 is rotated until the radial projection 15 abuts on the pin 20. By checking the corresponding position taken up by the chain guide 103 (kinematically connected to the output shaft 13 through the connecting rod 104), the position of the pin 20 is adjusted so that the output shaft 13 cannot rotate beyond a certain rotation angle that would take the chain guide 103 into a position in which the chain would fall outside of the gears of the crankset (or the sprockets of the sprocket set, in the case of a derailleur of the rear gearshift), in a direction towards the outside with respect to the bicycle frame.

Also in the case of the embodiment of FIGS. 6-9, the derailleur 1 is first mounted onto the bicycle frame.

Then the end stop elements are adjusted, i.e. the positions of the pin 20 in the hole 102c and of the further pin 220 in the further hole 202c are adjusted.

Such adjustment is carried out by acting on the head recess 20a and 220a of the pins 20 and 220 with an Allen key, a screwdriver or similar tool, so as to screw the pins 20 and 220 into the holes 102c and 202c by a suitable amount.

In particular, the output shaft 13 is rotated until the radial projection 15 abuts on the pin 20. By checking the corresponding position taken up by the chain guide 103 (kinematically connected to the output shaft 13 through the connecting rod 104), the position of the pin 20 is adjusted so that the output shaft 13 cannot rotate beyond a certain rotation angle that would take the chain guide 103 into a position in which the chain would fall outside of the gears of the crankset (or the sprockets of the sprocket set, in the case of a derailleur of the rear gearshift), in a direction towards the outside with respect to the bicycle frame.

Moreover, the output shaft 13 is rotated until the radial projection 215 abuts on the further pin 220. By checking the corresponding position taken up by the chain guide 103 (kinematically connected to the output shaft 13 through the connecting rod 104), the position of the further pin 220 is adjusted so that the output shaft 13 cannot rotate beyond a certain rotation angle that would take the chain guide 103 into a position in which the chain would fall inside the gears of the crankset (or the sprockets of the sprocket set, in the case of a derailleur of the rear gearshift), in a direction towards the bicycle frame.

Preferably, the connecting rod 104 is made from light metallic material or from composite material. In this way, a lightweight derailleur is obtained, which is particularly sought after in the case in which it is intended to be used on a racing bicycle.

By compound material a material is meant consisting of at least two components including a polymeric matrix and a filler comprising, for example, structural fibres, granules or powders. The structural fibres are preferably selected from the group consisting of carbon fibres, glass fibres, aramid fibres, ceramic fibres, boron fibres and combinations thereof. Carbon fibres are particularly preferred. Preferably, the polymeric material is thermosetting and preferably comprises an epoxy resin. However, this does not rule out the possibility of using a thermoplastic material.

Preferably, the pin 20 is made from metallic material.

In the case in which the support body 102 is made from composite material, the hole 102c can be made on a metallic insert inserted in the wall 102b of the support body 102. The metallic insert is blocked in the wall 102b, for example through gluing or mechanical interference or with other equivalent blocking means, or it is co-moulded in the wall 102b.

Although the invention has been described and illustrated with reference only to the coupling between the support body 102 and the connecting rod 104, alternatively it can be applied in a totally analogous manner to the coupling between the support body 102 and the connecting rod 105 (or the output shaft 13 of the gear motor unit 10 can be coupled with the connecting rod 105 instead of with the connecting rod 104).

Of course, a man skilled in the art can bring many modifications and variants to the motor driven derailleur for a bicycle gearshift and to the bicycle gearshift described above, in order to satisfy specific and contingent requirements, all of which are in any case covered by the scope of protection of the present invention as defined by the following claims.

What is claimed is:

1. Motor actuated derailleur for a bicycle gearshift, comprising:
   a support body adapted for mounting on a bicycle frame,
   a chain guide suitable for moving a bicycle chain between different engaged positions on respective gear wheels,
   a pair of connecting rods that connect said chain guide to said support body, a first connecting rod of said pair of connecting rods being rotatable about a first rotation axis (X) at a first end thereof,
   a gear motor unit housed in said support body and provided with an output shaft able to rotate about a second rotation axis (Y),
   a motion transmission between said gear motor unit and said first connecting rod, housed in an inner chamber of said support body, and
   wherein said inner chamber comprises at least one adjustable end stop element that prevents the rotation of the output shaft beyond a predetermined rotation angle, in at least one of the two directions of rotation of the output shaft.

2. Derailleur according to claim 1, wherein said motion transmission comprises a first toothed sector formed on said first connecting rod at said first end, and a second toothed sector formed on said output shaft, the second toothed sector matching and coupling with the first toothed sector.

3. Derailleur according to claim 2, wherein said at least one end stop element is a pin provided with external threading, which engages in a threaded through hole formed in a wall of said support body and facing into said inner chamber, wherein the position of said pin in said hole is adjustable through screwing of the pin in the hole.

4. Derailleur according to claim 3, wherein said output shaft comprises a radial projection that hits said pin in an end stop condition.

5. Derailleur according to claim 4, wherein said radial projection is made, along the second rotation axis (Y), substantially at said second toothed sector.

6. Derailleur according to claim 2, wherein said at least one end stop element prevents the rotation of the output shaft beyond a predetermined rotation angle in the direction of rotation that corresponds to a movement of the chain guide towards the outside with respect to the bicycle frame on which the derailleur is mounted.

7. Derailleur according to claim 6, wherein said at least one end stop element comprises a further pin provided with an external threading, which engages in a further threaded through hole formed in a wall of said support body and facing into said inner chamber, wherein the position of said further pin in said further hole is adjustable through screwing of the further pin in the further hole.

8. Derailleur according to claim 7, wherein said output shaft comprises a further radial projection that hits said further pin in a further end stop condition, and prevents the rotation of the output shaft beyond a predetermined rotation angle in the direction of rotation that corresponds to a movement of the chain guide towards the bicycle frame on which the derailleur is mounted.

9. Derailleur according to claim 8, wherein said further radial projection is made in a respective portion of the output shaft that is beside, along the second rotation axis (Y), a portion where said second toothed sector is made.

10. Derailleur according to claim 1, wherein said gearshift is a front gearshift.

11. A bicycle gearshift comprising a derailleur according to claim 1.

* * * * *